US012732453B2

(12) United States Patent
Hayward et al.

(10) Patent No.: US 12,732,453 B2
(45) Date of Patent: Sep. 8, 2026

(54) FAST MEDIA FLOW FAILOVER IN LAYER 4 NETWORKS

(71) Applicant: MICROSOFT TECHNOLOGY LICENSING, LLC, Redmond, WA (US)

(72) Inventors: Anthony Brian Hayward, Edinburgh (GB); Andrew John Tylee, Royal Leamington Spa (GB); Matthew John Russell, Cambridge (GB); William Richard Ouldridge, Cambridge (GB); Michael Jeffrey Evans, Harpenden (GB); Yuval Kramer, Cambridge (GB); David Alexander Jackson, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 341 days.

(21) Appl. No.: 18/379,141

(22) Filed: Oct. 11, 2023

(65) Prior Publication Data

US 2025/0126054 A1 Apr. 17, 2025

(51) Int. Cl.
*H04L 45/28* (2022.01)
*H04L 45/00* (2022.01)
*H04L 45/64* (2022.01)

(52) U.S. Cl.
CPC .............. *H04L 45/28* (2013.01); *H04L 45/64* (2013.01); *H04L 45/66* (2013.01)

(58) Field of Classification Search
CPC . H04L 12/4633; H04L 12/4641; H04L 45/28; H04L 45/64; H04L 45/66; H04L 61/103; H04L 67/1001; H04L 69/40
See application file for complete search history.

(56) References Cited

U.S. PATENT DOCUMENTS

2016/0210209 A1* 7/2016 Verkaik ............... G06F 11/2028
2021/0385155 A1* 12/2021 Suryanarayana ....... H04L 45/64
(Continued)

OTHER PUBLICATIONS

International Search Report and Written Opinion received for PCT Application No. PCT/US2024/047350, mailed on Jan. 14, 2025, 15 pages.
(Continued)

*Primary Examiner* — Donald L Mills
(74) *Attorney, Agent, or Firm* — Han Gim; Newport IP, LLC

(57) ABSTRACT

High availability network services are provided in a communications network comprising a plurality of network devices including a network function implemented as two instances configured as an active instance and a backup instance. The backup instance maintains state data such that the backup instance can actively provide services in response to a failure of the active instance. A pool of data forwarding functions sends, over a tunnel connection, ingress data packets to the network function based on a MAC address of the active instance on an overlay network. When the active instance has failed, the backup instance provides the network function and the pool of data forwarding functions sends over the tunnel connection, subsequent ingress data packets to the network function based on an overlay network MAC address of the backup instance.

20 Claims, 6 Drawing Sheets

(56) References Cited

U.S. PATENT DOCUMENTS

| | | | | |
|---|---|---|---|---|
| 2023/0131054 | A1 | 4/2023 | Boutros | |
| 2023/0216774 | A1* | 7/2023 | Suryanarayana | H04L 45/02 370/254 |
| 2025/0156284 | A1* | 5/2025 | Brar | G06F 9/45558 |

OTHER PUBLICATIONS

Verizon, et al., "NVO3 Data Plane Requirements; draft-ietf-nvo3-dataplane-requirements-02.txt", Nvo3 data plane requirements; draft-ietf-nv03-dataplane-requirements-02. Txt—internet engineering task force—ietf, Nov. 12, 2013, 20 pages.

International Preliminary Report on Patentability received for PCT Application No. PCT/US2024/047350, mailed on Apr. 23, 2026, 09 pages.

* cited by examiner receiving, from a load balancer by a pool of data forwarding functions implemented on a plurality of nodes of the communications network, ingress data packets addressed to the network function via a public network address — 301 forwarding, by the pool of data forwarding functions over a tunnel connection, the ingress data packets to the network function based on an overlay network MAC address of the active instance — 303 determining that the active instance has failed and that the backup instance will provide the network function — 305 forwarding, by the pool of data forwarding functions over the tunnel connection, subsequent ingress data packets to the network function based on an overlay network MAC address of the backup instance — 307 sending egress data packets directly to the load balancer — 309

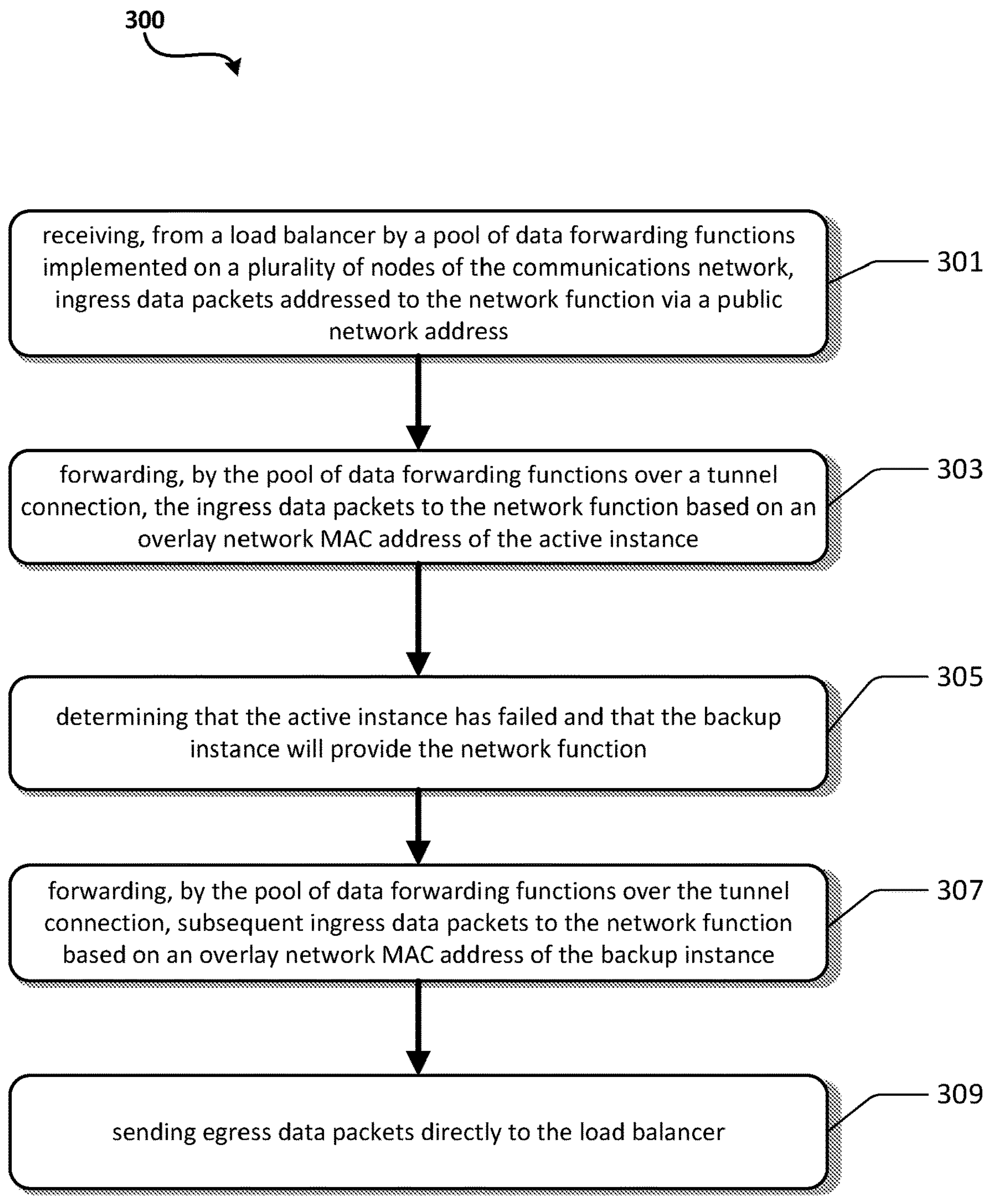

FIG. 3

FAST MEDIA FLOW FAILOVER IN LAYER 4 NETWORKS

BACKGROUND

Internet-based transport technologies typically include a packet switched network at Layer 4 of the International Organization for Standardization (OSI) model, also referred to as the transport layer. Layer 4 manages network traffic between hosts and end systems to facilitate data transfers. Examples of protocols that run on Layer 4 include Transmission Control Protocol (TCP) and User Datagram Protocol (UDP). Layer 4 networks do not allow traditional fast media failover methods to be implemented (e.g., gratuitous ARP) and can exhibit significant latency in migrating Internet Protocol (IP) addresses from one node to another. It is with respect to these considerations and others that the disclosure made herein is presented.

SUMMARY

Overlay networks can be used to address some of the failover issues noted above, but it is difficult to extend overlay networks to many of today's existing networks. The present disclosure describes methods and systems for implementing an overlay network within a Layer 4 network while achieving fast connection failover, and allowing for communication to outside networks using standard load balancers typically available at the edge of a Layer 4 network. In an embodiment, a system for enabling fast media failover includes a load balancer in a Layer 4 network, a pool of packet forwarding nodes such as virtual machines, and a set of high availability network functions running on nodes in an active/standby cluster.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 3 is a flowchart depicting an example procedure in accordance with the present disclosure;

DETAILED DESCRIPTION

In many applications such as in telecommunications, high availability is typically implemented by switching from a failed instance to a backup instance of a network service and moving IP addresses accordingly. Such a switchover can be implemented using a Layer 2 networking method such as gratuitous address resolution protocol (ARP), which comprises announcing a node's own IP address so that peers on the network will update their address resolution tables and send packets destined for that IP address to the node's MAC address. If performed correctly, the switchover can be implemented in a near seamless manner or with a minor interruption in service. However, such fast switchover mechanisms are not available in higher networking levels that are implemented in cloud-based networks.

The present disclosure provides a way to implement equivalent network functions that enable fast failover in networks where the logical switching of IP addresses between nodes would result in undesirable or prohibitive delays. In some embodiments, a tunneling protocol such as Virtual Extensible LAN (VXLAN) is implemented with a load balancer to direct traffic over tunnels during a failover within a Layer 4 network. Such a mechanism can be applied in a public cloud or and other environments that provide user services at the Layer 4 level where network elements are aware of the status of other networks and can move data traffic using their own mechanisms. While the examples herein are illustrated using VXLAN, it should be understood that other tunneling protocols can be implemented such as Internet Protocol Security (IPsec), Layer Two Tunneling Protocol (L2TP), Point-to-Point Tunneling Protocol (PPTP), or Generic Routing Encapsulation (GRE). Additionally, while the examples herein are illustrated using the transport of media, it should be understood that other types of data connections and data content can be implemented using the present disclosure.

Figure 1A:
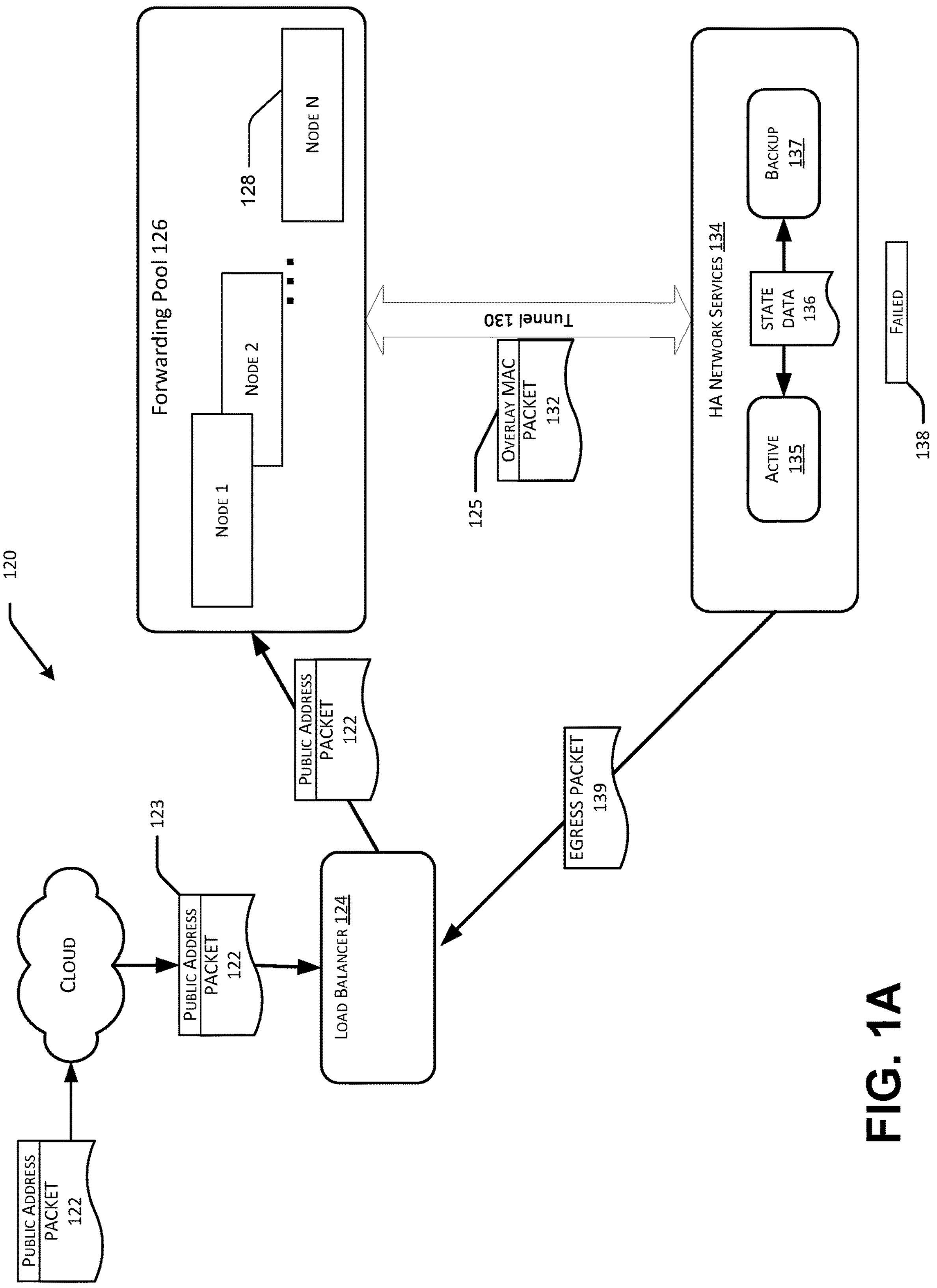
FIG. 1A is a diagram illustrating an example network in accordance with the present disclosure.

FIG. 1A illustrates an example communications network 120 where high availability (HA) network services are provided in the communications network 120. Communications network 120 comprises a plurality of network devices including a network function shown as HA network services 134 implemented as at least two instances (135, 137). The two instances comprise an active instance 135 and a backup instance 137. The backup instance 137 may also be referred to as a standby instance.

The backup instance 137 maintains state data 136 such that the backup instance 137 can actively provide services in response to a failure of the active instance 135. A pool 126 of data forwarding functions or nodes 128 receives, from a load balancer 124, ingress data packets 122 addressed to the network function via a public network address 123. The pool 126 of data forwarding functions are implemented on a plurality of nodes of the communication network 120. The pool 126 of data forwarding functions forwards, over a tunnel connection 130, the ingress data packets 132 to the network function provided by active instance 135 based on an overlay network MAC address 125 of the active instance 135. A determination is made that the active instance has failed 138 and that the backup instance 137 will provide the network function. The pool 126 of data forwarding functions forwards, over the tunnel connection 130, subsequent ingress data packets 122 to the network function based on the overlay network MAC address 125 of the backup instance 137. Egress data packets 139 are directly forwarded to the load balancer 124, bypassing the pool 126 of data forwarding functions.

Figure 1B:
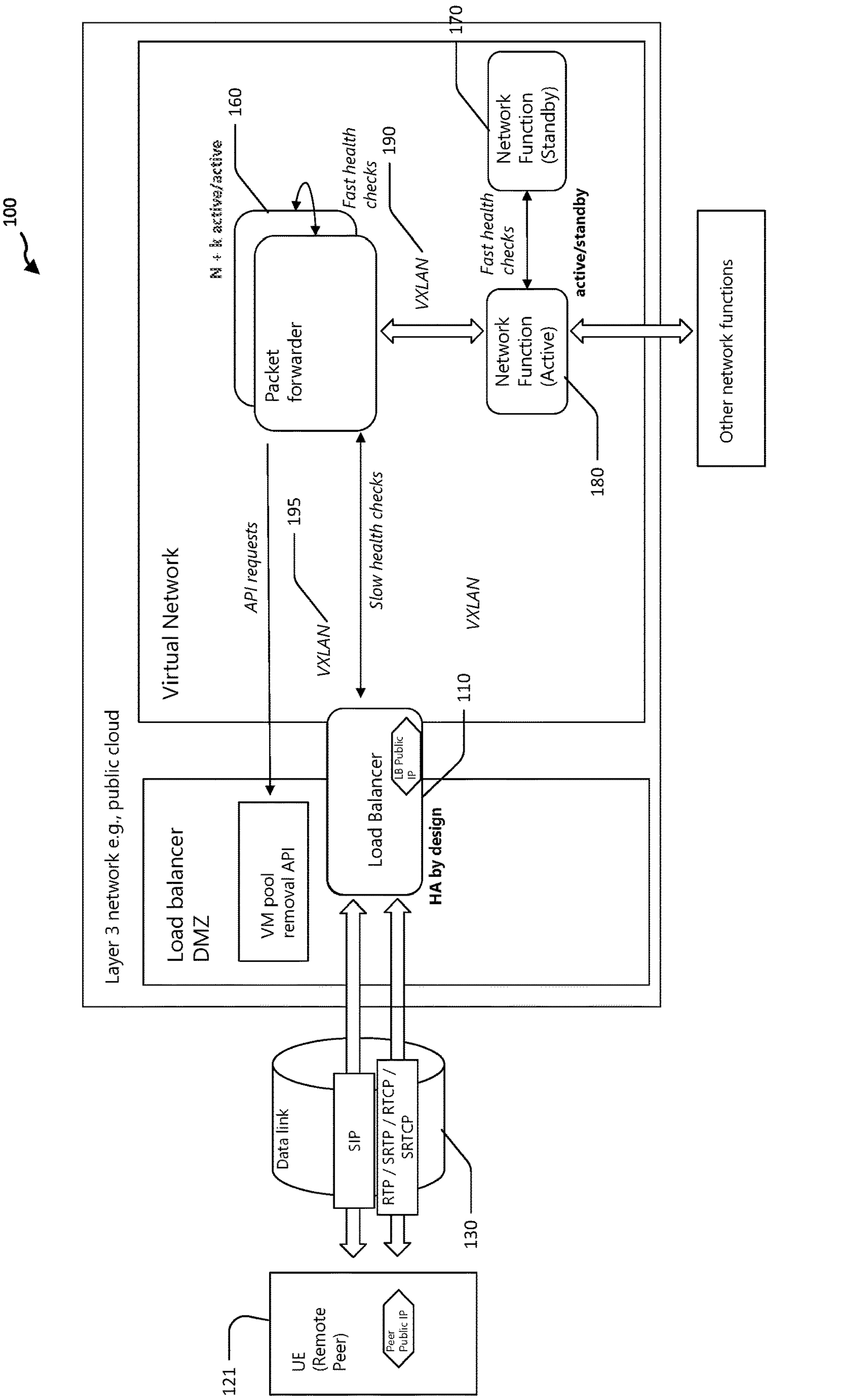
FIG. 1B is a diagram illustrating an example network in accordance with the present disclosure.

FIG. 1B illustrates an example underlay network 100 illustrating the disclosed embodiments at a Layer 3 network. A user equipment device (UE) 121 communicates via a data link 130 such as a radio network packet core connected via public appearing connections over a public IP address.

A load balancer 110 encapsulates data traffic in a VXLAN tunnel 195 with an active/active pool 160 of network virtual appliances or packet forwarder nodes configured as an N+k pool of nodes. The network virtual appliances or packet forwarder nodes forward the VXLAN packets to an active member 180 of a high availability (HA) group with a fast failover to a standby member 170 of the HA group. The fast failover is facilitated by using VXLAN tunnels 190 to allow an IP address to be quickly switched over from the active HA device 180 to the standby device 170.

In the return path, data can be sent directly through the load balancer and then back out to the Internet without having to go through packet forwarding devices.

Figure 2:
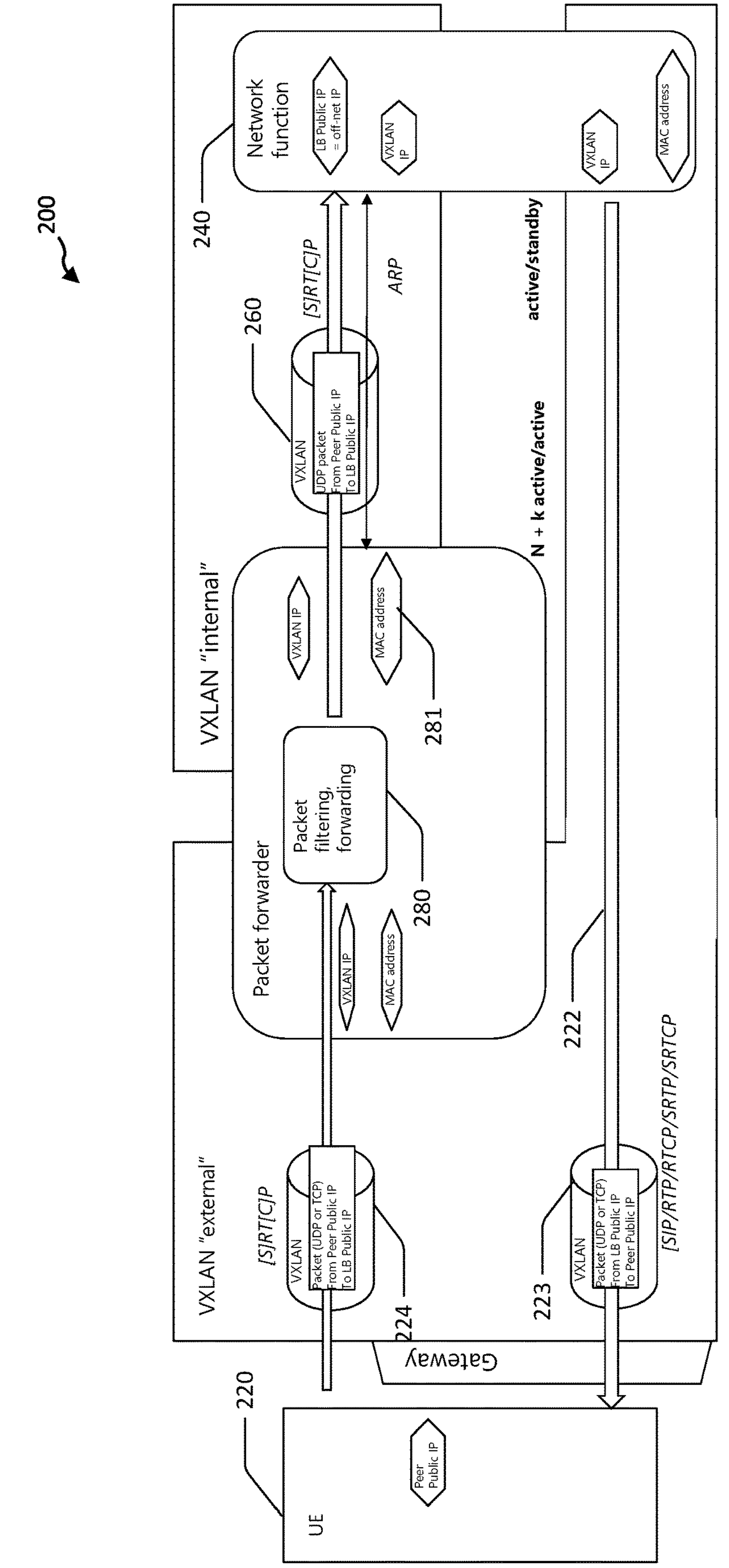
FIG. 2 is a diagram illustrating an example network in accordance with the present disclosure.

In the overlay network 200 shown in FIG. 2, UE 220 communicates via a radio network packet core connected via public appearing connections over a public IP address. Data traffic goes through the load balancer via VXLAN 224. The load balancer is not visible at this level as it is only visible in the underlay. Packets are filtered and forwarded 280 across to a different VXLAN 260 to the HA group providing the network function 240. The packets are forwarded using an overlay network MAC address 281. Return traffic 222 is passed back out through VXLAN 223 via the load balancer (not visible at this layer) and back out to the Internet.

The illustrated embodiments include the use of packet forwarding nodes to direct traffic behind a load balancer based on when the IP address changes in the overlay network. Additionally, a direct return path is provided so that the packet forwarding scheme is only implemented for ingress traffic.

While the examples are illustrated using packet forwarding virtual machines, it should be understood that the packet forwarding function can be performed by containers or other computing nodes. The HA group can provide various network functions which require a fast switchover of IP addresses between HA pairs or other combinations of HA devices. The HA group can be an N+K group with a mix of active and backup nodes, where each of the nodes are addressed by a different service IP address at any one time.

The disclosed embodiments can be used for data traffic running over various network protocols such as Real-time Transport Protocol (RTP), Secure Real-time Transport Protocol (SRTP), Real-Time Transport Control Protocol (RTCP), and Secure RTCP (SRTCP). The network protocols can be used with network devices such as a session border controller (SBC). Such network devices may manage thousands of concurrent calls/connections that would have to be renegotiated and switched if there is a switch from a primary device to a standby device. While such delays might be acceptable for some applications, for applications such as voice calls, the delay would result in noticeable downtime and a poor user experience.

In a typical switchover situation, nodes in a standby pair or cluster are responsible for detecting when a particular node should own an IP address and, in many cases, will send out a gratuitous ARP request which informs the Layer 2 network to direct all traffic towards a particular IP returned in the ARP response. For example, nodes can use gratuitous ARP to announce their IP-to-MAC address mapping. This would be done when the standby device detects that the active device has failed, for example. The network will automatically send traffic to the standby device, which will become the active node. However, the described process will not work in the underlay network in a cloud computing environment.

In the present disclosure, the gratuitous ARP process is used on top of the VXLAN and when the standby node detects that the active node has failed, the standby node will send out gratuitous ARPs on the VXLAN overlay network which is layer 2 aware, unlike the underlay network. The packet forwarding VMs will receive the updated mapping and update their forwarding functions accordingly and traffic will be redirected to the new overlay network MAC address.

In the case of a controlled failover case, for example, if a server is scheduled for maintenance and is the active node of a pair, then the active node can proactively initiate the switchover to transfer service to the standby node. This enables the service provider to perform the scheduled maintenance without significant effects on the service.

By providing an active/active pool of packet forwarding nodes in front of an active/standby pair or N+K group, continuity of service with fast failover can be provided in a cloud environment.

In one embodiment, a system for enabling fast media flow failover in Layer 4 networks comprises a load balancer that is available in the Layer 4 network, a pool of packet forwarder virtual machines, and a set of media controller virtual machines in an active/passive cluster.

In one example, the high availability function can be a media controller. The media controller can be instantiated on an active/passive cluster of virtual machines, using a virtual IP address advertised via a Layer 2 address resolution protocol (ARP) protocol. The advertised virtual IP address can be reassigned quickly (e.g., within 250 milliseconds) to a standby virtual machine using a gratuitous ARP packet. This fast failover enables minimal media dropout.

To enable interoperation of the disclosed Layer 2 failover mechanism with a Layer 4 network such as in a public cloud environment, an active/active pool of packet forwarding virtual machines is implemented in the ingress data path to the media controller. For example, the packet forwarding virtual machines may filter and forward UDP media traffic. The packet forwarding virtual machines send packets to the media controller over a VXLAN overlay network which supports the ARP protocol, allowing the media flow to be switched quickly when the packet forwarding virtual machines detect via ARP that a standby media controller virtual machine has become active.

The active/active pool of packet forwarding virtual machines may be connected to a load balancer which distributes ingress traffic across the pool. The load balancer may be slow to detect failure of a packet forwarding virtual machine, which is a potential cause of media dropout. This situation can be addressed differently for two distinct cases. In an embodiment, for controlled shutdowns, packet forwarding virtual machines can be drained before being removed from the pool, resulting in no media dropouts. In an embodiment, for the case of an uncontrolled failure, the packet forwarding virtual machines monitor each other using periodic polling. The packet forwarding virtual machines remove any failed packet forwarder from the active/active pool. In an embodiment, a pool update API provided by the cloud network may be called to remove the failed packet forwarder. In this case, the media dropout is the detection time plus the time taken by the removal process.

In an embodiment, the pool of packet forwarding virtual machines can include two components or types of virtual machines—a packet handling component and a pool supervisor component. The packet handling component is responsible for managing traffic between the load balancer and the HA function while handling any failover events without involving the load balancer. This can include updating or adding encapsulation on the VXLAN for traffic between the load balancer-facing VXLAN and the HA function-facing VXLANs and sending the traffic to the HA function for a given front end public IP address. The packet handling component will detect a failure event at a primary or active HA function instance and redirect flows to the new primary or active HA function instance. For example, this can be achieved by ARPing the overlay address of the HA function instance constantly to obtain the correct MAC address. The MAC address may be referred to as the overlay MAC address or the overlay network MAC address, In deployments where ingress traffic arrives from a known range of IP public IP addresses, the packet handling component is responsible for allowlisting/blocklisting traffic from outside the correct ranges. Where this is not possible because the address for the public IP traffic is not known beforehand, the packet handling component will pass all traffic for a given frontend public IP onto the backend deployment associated with that IP address.

The pool supervisor component is responsible for monitoring the packet forwarding VMs in the pool and removing VMs from the pool when they fail, or draining them when maintenance will be carried out for a given VM.

In an embodiment, the load balancer is responsible for receiving traffic from public ingress traffic and directing the traffic to the target HA function instance. This takes place before the upstream load balancers apply port filtering rules so that the load balancer will direct all traffic sent to the frontend IP into the backend (HA function instance). In performing this operation, the load balancer is responsible for encapsulating the traffic onto a VXLAN.

In an embodiment, a VXLAN tunnel is configured between the HA function instance and the load balancer which is used by service interfaces. To send traffic to the public IP addresses, the HA function instance attempts to send the traffic to the configured default gateway IP for the interface. The HA function instance will have sent an ARP (if IPv4, otherwise Neighbor Discovery Protocol (NDP) for IPV6) response for the default gateway overlay IP on the VXLAN interface, and the load balancer does not respond to these ARPs/NDPs. To resolve this, the HA function instance is modified to allow static configuration of the MAC address for a default gateway. If this is configured, the HA function instance will not send ARPs (IPv4 gateway) or NDPs (IPv6 gateway) for this address and will just use the statically configured MAC.

The load balancer is also responsible for load balancing between backend endpoints that can handle traffic and redirecting flows once it is informed that one of the endpoints is down.

The pool supervisor component runs on the same VMs as the packet handler component and operates in a model where one of the VMs is the leader and is responsible for performing the required actions until it is no longer a suitable leader, at which point one of the other VMs will automatically take over as leader.

Each VM maintains a measure of its health and the amount of time it has had that health. All VMs periodically poll all other VMs for their health and health time to build a profile of the health of the rest of the pool. In an embodiment, a lead VM is chosen as the VM with the highest health value and in the case where multiple VMs have equal values, the VM that has had this health for the longest is selected as the lead VM.

The cloud service provider may provide warnings for any VMs that are running on hosts that are scheduled to undergo maintenance. The pool supervisor component on each pool monitors these warnings for itself and adjusts the VM health based on a potential maintenance action, where the closer the maintenance, the lower the resulting health of the VM. If this VM was previously a lead VM, this will result in a new lead VM being chosen. In an embodiment, when a VM is below a health threshold, the process for responding to the load balancer's health probes is stopped, which causes the draining of the VM of traffic without interruption to the traffic.

In some embodiments, a VM health system can be used to drain a VM if the VM itself is undergoing maintenance (e.g., upgrade of the VM's software).

If the pool supervisor component does not receive a response from a VM in the pool informing it of the VM's health, the VM is immediately marked as having a health of 0. If the instance of the pool supervisor is the lead VM, the pool supervisor removes this VM's network interface card (NIC) from the load balancer's backend pools until the VM has recovered. If a node VM from 0 health to above the drain threshold, the pool supervisor adds the VM's NIC back to the backend pools.

In order to detect when a failover has occurred, the present disclosure describes two embodiments.

Parallel VXLAN tunnels—a separate probing tunnel is established on the HA function, which is used to determine which HA function instance in a HA pair/group is primary. The main traffic tunnel is updated between the packet forwarding pool and that HA function instance so that data is sent the current primary instance (by changing which underlay peer it sends traffic to).

Allow egress ARP/NDP traffic on an inbound-only VXLAN tunnel—the HA function instance does not use off-LAN local IP addresses and operates as if it owns the IP addresses on the overlay network by using on-LAN local IP addresses.

Turning now to FIG. 3, illustrated is an example procedure 300 for providing high availability network services in a communications network in accordance with the present disclosure. Such a procedure can be provided by functions illustrated, for example, in FIGS. 1-2. The communications network comprises a plurality of network devices running a network function implemented as at least two instances comprising an active instance and a backup instance. The backup instance maintains state data such that the backup instance can actively provide services in response to a failure of the active instance.

Referring to FIG. 3, operation 301 illustrates receiving, from a load balancer by a pool of data forwarding functions implemented on a plurality of nodes of the communications network, ingress data packets addressed to the network function via a public network address.

Operation 303 illustrates forwarding, by the pool of data forwarding functions over a tunnel connection, the ingress data packets to the network function based on an overlay network MAC address of the active instance.

Operation 305 illustrates determining that the active instance has failed and that the backup instance will provide the network function.

Operation 307 illustrates forwarding, by the pool of data forwarding functions over the tunnel connection, subsequent ingress data packets to the network function based on an overlay network MAC address of the backup instance.

Operation 309 illustrates sending egress data packets directly to the load balancer.

The various aspects of the disclosure are described herein with regard to certain examples and embodiments, which are intended to illustrate the disclosure. It should be appreciated that the subject matter presented herein is implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations is performed in combination with other types of program modules. Generally, program modules include routines, programs, components, data structures and other types of structures that perform particular tasks or implement particular abstract data types.

Those skilled in the art will also appreciate that the subject matter described herein can be practiced on or in conjunction with other computer system configurations beyond those described herein, including multiprocessor systems. The embodiments described herein can also be practiced in distributed computing environments, where tasks are performed by remote processing devices that are linked through a communications network. In a distributed computing environment, program modules are located in both local and remote memory storage devices.

Networks established by or on behalf of a user to provide one or more services (such as various types of cloud-based computing or storage) accessible via the Internet and/or other networks to a distributed set of clients can be referred to as a service provider. Such a network includes one or more data centers such as data center 400 illustrated in FIG. 4, which are configured to host physical and/or virtualized computer servers, storage devices, networking equipment and the like, that is used to implement and distribute the infrastructure and services offered by the service provider.

Figure 4:
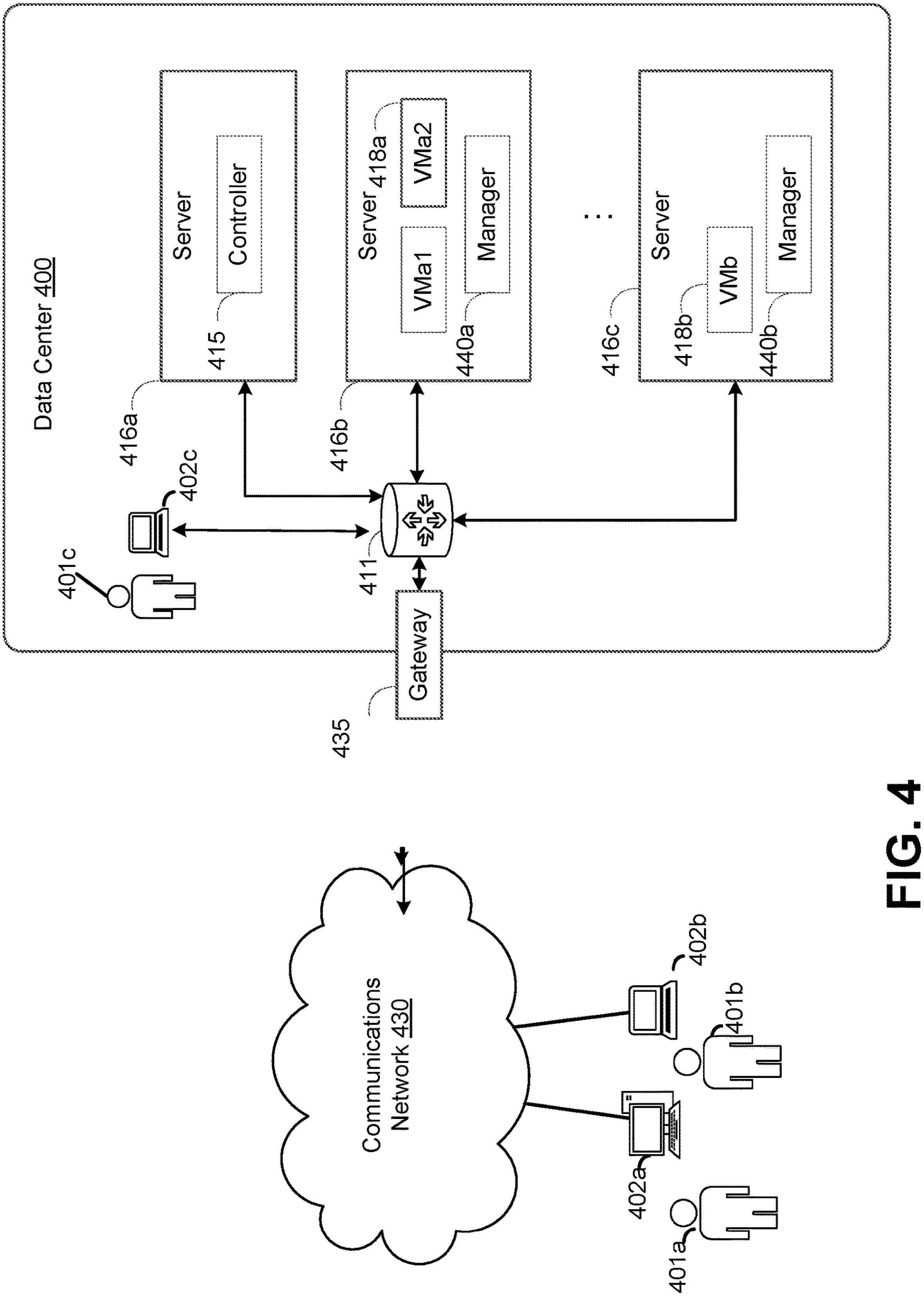
FIG. 4 is a diagram illustrating an example architecture in accordance with the present disclosure.

FIG. 4 illustrates a data center 400 that is configured to provide computing resources to users 401*a*, 401*b*, or 401*c* (which is referred herein singularly as "a user 401" or in the plural as "users 401") via user computers 402*a*, 402*b*, and 402*c* (which is referred herein singularly as "a computer 402" or in the plural as "computers 402") via a communications network 430. The computing resources provided by the data center 400 includes various types of resources, such as computing resources, data storage resources, data communication resources, and the like. Each type of computing resource can be general-purpose or available in a number of specific configurations. A virtual computing instance is referred to as a virtual machine and can, for example, comprise one or more servers with a specified computational capacity (which is specified by indicating the type and number of CPUs, the main memory size and so on) and a specified software stack (e.g., a particular version of an operating system, which in turn run on top of a hypervisor). In some embodiments, computing resources are available as virtual machines. The virtual machines are configured to execute applications, including Web servers, application servers, media servers, database servers, and the like. Data storage resources include file storage devices, block storage devices, and the like. Each type of computing resource can be available in different configurations, such as the number of processors, and size of memory and/or storage capacity. The resources in some embodiments are offered to clients in units referred to as instances, such as virtual machine instances or storage instances.

Data center 400 includes servers 416*a*, 416*b*, and 416*c* (referred to herein singularly as "a server 416" or in the plural as "servers 416") that provide computing resources available as virtual machines 418*a* and 418*b* (referred to herein singularly as "a virtual machine 418" or in the plural as "virtual machines 418"). The virtual machines 418 are configured to execute applications such as Web servers, application servers, media servers, database servers, and the like. Other resources include data storage resources (not shown on FIG. 4) and include file storage devices, block storage devices, and the like. Servers 416 also execute functions that manage and control allocation of resources in the data center, such as a controller 415. Controller 415 can be a fabric controller or another type of program configured to manage the allocation of virtual machines on servers 416.

Referring to FIG. 4, communications network 430 can, for example, be a publicly accessible network of linked networks and operated by various entities, such as the Internet. In other embodiments, communications network 430 is a private network, such as a corporate network that is wholly or partially inaccessible to the public.

Communications network 430 provides access to computers 402. Computers 402 include computers utilized by users 401. Computer 402*a*, 402*b* or 402*c* can be a server, a desktop or laptop personal computer, a tablet computer, a smartphone, a set-top box, or any other computing device capable of accessing data center 400. User computer 402*a* or 402*b* connects directly to the Internet (e.g., via a cable modem). User computer 402*c* can be internal to the data center 400 and connect directly to the resources in the data center 400 via internal networks. Although only three user computers 402*a*, 402*b*, and 402*c* are depicted, it should be appreciated that there can be multiple user computers.

Computers 402 are also utilized to configure aspects of the computing resources provided by data center 400. For example, data center 400 provides a Web interface through which aspects of its operation can be configured through the use of a Web browser application program executing on user computer 402. Alternatively, a stand-alone application program executing on user computer 402 can be used to access an application programming interface (API) exposed by data center 400 for performing the configuration operations.

Servers 416 are configured to provide the computing resources described above. One or more of the servers 416 are configured to execute a manager 440*a* or 440*b* (referred herein singularly as "a manager 440" or in the plural as "managers 440") configured to execute the virtual machines. The managers 420 can be a virtual machine monitor (VMM), fabric controller, or another type of program configured to enable the execution of virtual machines 418 on servers 416, for example.

It should be appreciated that although the embodiments disclosed above are discussed in the context of virtual machines, other types of implementations can be utilized with the concepts and technologies disclosed herein.

In the example data center 400 shown in FIG. 4, a network device 411 is utilized to interconnect the servers 416*a* and 416*b*. Network device 411 comprises one or more switches, routers, or other network devices. Network device 411 is also be connected to gateway 435, which is connected to communications network 430. Network device 411 facilitates communications within networks in data center 400, for example, by forwarding packets or other data communications as appropriate based on characteristics of such communications (e.g., header information including source and/or destination addresses, and protocol identifiers) and/or the characteristics of the private network (e.g., routes based on network topology). It will be appreciated that, for the sake of simplicity, various aspects of the computing systems and other devices of this example are illustrated without showing certain conventional details. Additional computing systems and other devices can be interconnected in other embodiments and interconnected in different ways.

It should be appreciated that the network topology illustrated in FIG. 4 has been greatly simplified and that many more networks and networking devices can be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device comprise any combination of hardware or software that can interact and perform the described types of functionality, including desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules can, in some embodiments be combined in fewer modules or distributed in additional modules. Similarly, in some embodiments the functionality of some of the illustrated modules are not provided and/or other additional functionality can be implemented.

Figure 5:
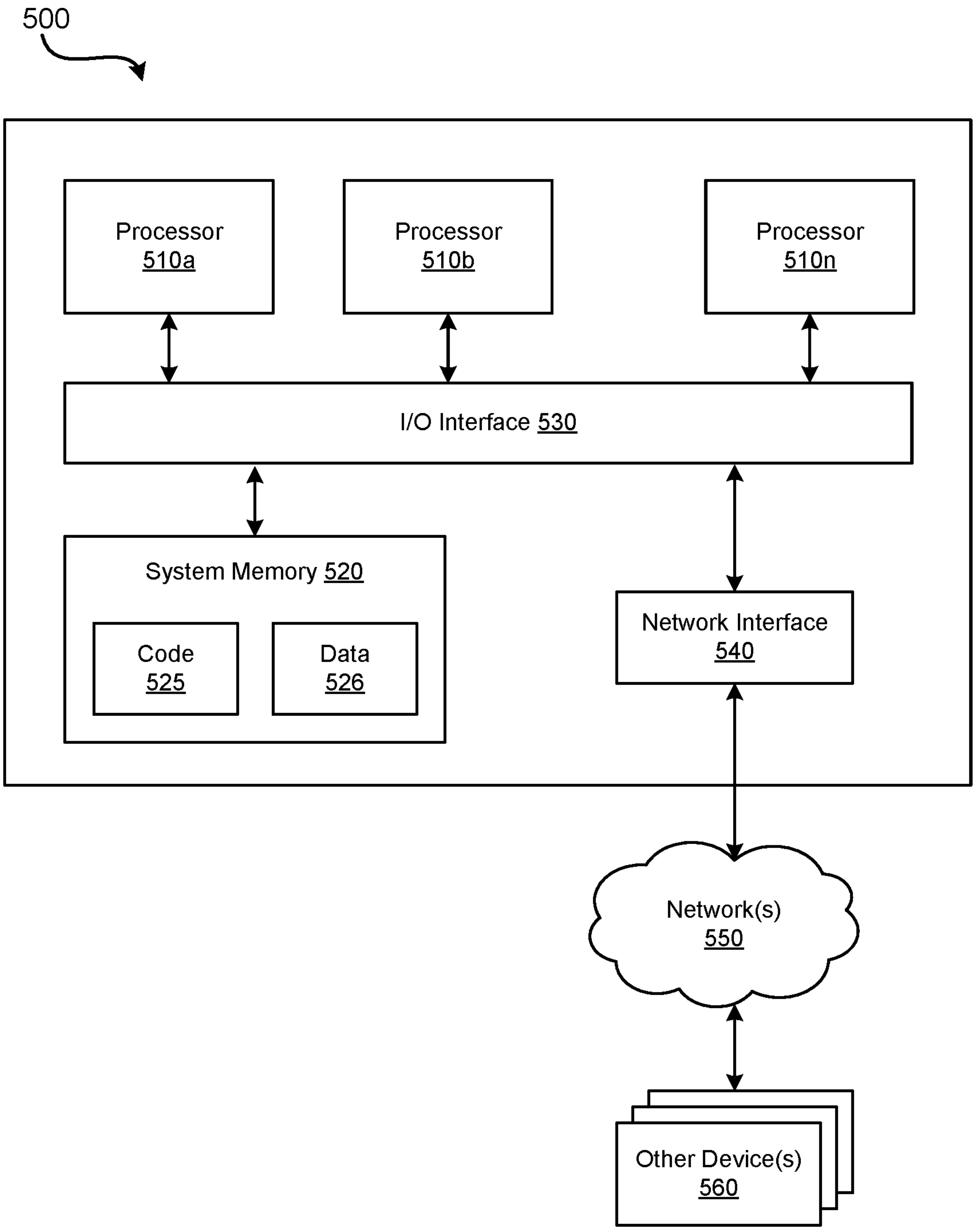
FIG. 5 is an example computing device in accordance with the present disclosure.

In some embodiments, a server that implements a portion or all of one or more of the technologies described herein, including the techniques to implement the communication of traffic includes a general-purpose computer system that includes or is configured to access one or more computer-accessible media. FIG. 5 illustrates such a general-purpose computing device 500. In the illustrated embodiment, computing device 500 includes a processing system comprising one or more processors 510*a*, 510*b*, and/or 510*n* (referred herein singularly as "a processor 510" or in the plural as "processors 510") coupled to a system memory 520 via an input/output (I/O) interface 530. Computing device 500 further includes a network interface 540 coupled to I/O interface 530.

In various embodiments, computing device 500 can be a uniprocessor system including one processor 510 or a multiprocessor system including several processors 510 (e.g., two, four, eight, or another suitable number). Processors 510 can be any suitable processors capable of executing instructions. For example, in various embodiments, processors 510 can be general-purpose or embedded processors implementing any of a variety of instruction set architectures (ISAs), such as the x56, PowerPC, SPARC, or MIPS ISAs, or any other suitable ISA. In multiprocessor systems, each of processors 510 commonly, but not necessarily, implement the same ISA.

System memory 520 is configured to store instructions and data accessible by processor(s) 510. In various embodiments, system memory 520 is implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 is configured to coordinate I/O traffic between the processor 510, system memory 520, and any peripheral devices in the device, including network interface 540 or other peripheral interfaces. In some embodiments, I/O interface 530 performs any necessary protocol, timing, or other data transformations to convert data signals from one component (e.g., system memory 520) into a format suitable for use by another component (e.g., processor 510). In some embodiments, I/O interface 530 includes support for devices attached through various types of peripheral buses, such as a variant of the Peripheral Component Interconnect (PCI) bus standard or the Universal Serial Bus (USB) standard, for example. In some embodiments, the function of I/O interface 530 is split into two or more separate components. Also, in some embodiments some or all of the functionality of I/O interface 530, such as an interface to system memory 520, can be incorporated directly into processor 510.

Network interface 540 is be configured to allow data to be exchanged between computing device 500 and other device or devices 560 attached to a network or network(s) 550, such as other computer systems or devices as illustrated in FIGS. 1 through 4, for example. In various embodiments, network interface 540 supports communication via any suitable wired or wireless general data networks, such as types of Ethernet networks, for example. Additionally, network interface 540 supports communication via telecommunications/telephony networks such as analog voice networks or digital fiber communications networks, via storage area networks such as Fibre Channel SANs or via any other suitable type of network and/or protocol.

In some embodiments, system memory 520 is one embodiment of a computer-accessible medium configured to store program instructions and data as described above for FIGS. 1-7 for implementing embodiments of the corresponding methods and apparatus. However, in other embodiments, program instructions and/or data are received, sent or stored upon different types of computer-accessible media. A computer-accessible medium includes non-transitory storage media or memory media, such as magnetic or optical media, e.g., disk or DVD/CD coupled to computing device 500 via I/O interface 530. A non-transitory computer-accessible storage medium also includes any volatile or non-volatile media, such as RAM (e.g., SDRAM, DDR SDRAM, RDRAM, SRAM) and ROM, that are included in some embodiments of computing device 500 as system memory 520 or another type of memory. Further, a computer-accessible medium include transmission media or signals such as electrical, electromagnetic or digital signals, conveyed via a communication medium such as a network and/or a wireless link, such those implemented via network interface 540. Portions or all of multiple computing devices, such as those illustrated in FIG. 5, are used to implement the described functionality in various embodiments: for example, software components running on a variety of different devices and servers collaborate to provide the functionality. In some embodiments, portions of the described functionality are implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein refer to a mass storage device, such as a solid-state drive, a hard disk or CD-ROM drive. However, it should be appreciated by those skilled in the art that computer-readable media can be any available computer storage media that can be accessed by a computing device.

By way of example, computer storage media include volatile and non-volatile, removable and non-removable media implemented in any method or technology for storage of information such as computer-readable instructions, data structures, program modules or other data. For example, computer media includes RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also transform the physical structure of the computer-readable media presented herein. The specific transformation of physical structure depend on various factors, in different implementations of this description. Examples of such factors include the technology used to implement the computer-readable media, whether the computer-readable media is characterized as primary or secondary storage, and the like. For example, if the computer-readable media is implemented as semiconductor-based memory, the software disclosed herein are encoded on the computer-readable media by transforming the physical state of the semiconductor memory. For example, the software transforms the state of transistors, capacitors, or other discrete circuit elements constituting the semiconductor memory. The software also transforms the physical state of such components in order to store data thereupon.

As another example, the computer-readable media disclosed herein can be implemented using magnetic or optical technology. In such implementations, the software presented herein transforms the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices do not include all of the illustrated components shown in FIG. 5, include other components that are not explicitly shown in FIG. 5, or utilize an architecture completely different than that shown in FIG. 5.

The disclosure presented herein encompasses the subject matter set forth in the following example clauses.

Clause 1: A method for providing high availability network services in a communications network comprising a plurality of network devices running a network function implemented as at least two instances comprising an active instance and a backup instance, wherein the backup instance maintains state data such that the backup instance can actively provide services in response to a failure of the active instance, the method comprising:

receiving, from a load balancer by a pool of data forwarding functions implemented on a plurality of nodes of the communications network, ingress data packets addressed to the network function via a public network address;

forwarding, by the pool of data forwarding functions over a tunnel connection, the ingress data packets to the network function based on an overlay network MAC address of the active instance;

determining that the active instance has failed and that the backup instance will provide the network function; and forwarding, by the pool of data forwarding functions over the tunnel connection, subsequent ingress data packets to the network function based on an overlay network MAC address of the backup instance.

Clause 2: The method of clause 1, wherein the overlay network MAC address of the active instance and the backup instance are determined using gratuitous ARP.

Clause 3: The method of any of clauses 1-2, wherein the plurality of nodes are virtual machines or containers.

Clause 4: The method of any of clauses 1-3, further comprising sending egress data packets directly to the load balancer.

Clause 5: The method of any of clauses 1-4, wherein the pool of data forwarding functions comprise an N+k pool of devices.

Clause 6: The method of any of clauses 1-5, further comprising instantiating additional backup instances such that the network function is provided by an N+k pool of instances in an active/backup configuration.

Clause 7: The method of any of clauses 1-6, wherein for controlled shutdowns, data forwarding functions are drained before being removed from the pool.

Clause 8: The method of any of clauses 1-7, wherein the data forwarding functions monitor each other using periodic polling, and failed data forwarding functions are removed from the pool.

Clause 9: The method of any of clauses 1-8, wherein the pool of data forwarding functions comprise:

a packet handling component configured to managing traffic between the load balancer and the network function while handling failover events; and a pool supervisor component configured to:

monitor the data forwarding functions and remove data forwarding functions from the pool in response to a failure, or draining data forwarding functions when maintenance will be carried out for a given data forwarding function.

Clause 10: The method of any of clauses 1-9, wherein each data forwarding function maintains a measure of its health and an amount of time associated with the measure.

Clause 11: The method of any of clauses 1-10, wherein a lead data forwarding function is selected as a data forwarding function with a highest health value; and where multiple data forwarding functions have an equal value, a data forwarding function that has had the equal value for a longest time period is selected as the lead data forwarding function.

Clause 12: The method of any of clauses 1-11, further comprising established a separate probing tunnel on the network function, the separate probing tunnel usable to determine which network function instance is primary.

Clause 13: The method of any of clauses 1-12, wherein the tunnel connection is established using one of IPsec, L2TP, PPTP, GRE, or VXLAN.

Clause 14: A system for providing high availability network services in a communications network, the system comprising a plurality of network nodes including a network function implemented as two instances configured as an active instance and a backup instance, wherein the backup instance maintains state data such that the backup instance can actively provide services in response to a failure of the active instance, the system comprising:

a processing system; and a memory storing computer-executable instructions thereupon which, when executed by the processing system, cause the system to perform operations comprising:

receiving, by a pool of data forwarding functions implemented on the plurality of network nodes, ingress data packets addressed to the network function via a public network address;

forwarding, by the pool of data forwarding functions over a tunnel connection, the ingress data packets to the network function based on an overlay network MAC address of the active instance;

determining that the active instance has failed and that the backup instance will provide the network function; and forwarding, by the pool of data forwarding functions over the tunnel connection, subsequent ingress data packets to the network function based on an overlay network MAC address of the backup instance.

Clause 15: The system of clause 14, wherein the overlay network MAC address of the active instance and the backup instance are determined using gratuitous ARP.

Clause 16: The system of any of clauses 14 and 15, wherein the plurality of network nodes are virtual machines or containers.

Clause 17: A computer-readable storage medium storing computer-executable instructions thereupon which, when executed by a processing system, cause the processing system to perform operations comprising:

receiving, from a load balancer by a pool of data forwarding functions implemented on a plurality of nodes of a communication network, ingress data packets addressed to a network function via a public network address, wherein the communications network comprises a plurality of network devices including the network function implemented as two instances configured as an active instance and a backup instance, wherein the backup instance maintains state data such that the backup instance can actively provide services in response to a failure of the active instance;

forwarding, by the pool of data forwarding functions over a tunnel connection, the ingress data packets to the network function based on an overlay network MAC address of the active instance;

determining that the active instance has failed and that the backup instance will provide the network function;

forwarding, by the pool of data forwarding functions over the tunnel connection, subsequent ingress data packets to the network function based on a overlay network MAC address of the backup instance; and sending egress data packets directly to the load balancer.

Clause 18: The system of clause 17, wherein the overlay network MAC address of the active instance and the backup instance are determined using gratuitous ARP.

Clause 19: The system of any of clauses 17 and 18, wherein the data forwarding functions monitor each other using periodic polling, and failed data forwarding functions are removed from the pool.

Clause 20: The system of any of the clauses 17-19, wherein the pool of data forwarding functions comprise:

a packet handling component configured to managing traffic between the load balancer and the network function while handling failover events; and a pool supervisor component configured to:

monitor the data forwarding functions and remove data forwarding functions from the pool in response to a failure, or draining data forwarding functions when maintenance will be carried out for a given data forwarding function.

The invention claimed is:

1. A method for providing high availability network services in a communications network comprising a plurality of network devices running a network function implemented as at least two instances comprising an active instance and a backup instance, wherein the backup instance maintains state data such that the backup instance can actively provide services in response to a failure of the active instance, the method comprising:

receiving, from a load balancer by a pool of data forwarding functions implemented on a plurality of nodes of the communications network, ingress data packets addressed to the network function via a public network address;

forwarding, by the pool of data forwarding functions over a tunnel connection, the ingress data packets to the network function based on an overlay network MAC address of the active instance;

determining that the active instance has failed and that the backup instance will provide the network function, wherein determining that the active instance has failed comprises detecting a loss of a direct link between a forwarding node and an edge node hosting the active instance;

removing an association between the overlay network MAC address and the edge node from a forwarding table without exchanging state information with the backup instance; and forwarding, by the pool of data forwarding functions over the tunnel connection, subsequent ingress data packets to the network function based on an overlay network MAC address of the backup instance without waiting for underlay routing updates.

2. The method of claim 1, wherein the overlay network MAC address of the active instance and the backup instance are determined using gratuitous Address Resolution Protocol (ARP).

3. The method of claim 1, wherein the plurality of nodes are virtual machines or containers.

4. The method of claim 1, further comprising sending egress data packets directly to the load balancer.

5. The method of claim 1, wherein the pool of data forwarding functions comprise an N+k pool of devices, wherein N is a number of active devices and k is a number of standby devices.

6. The method of claim 1, further comprising instantiating additional backup instances such that the network function is provided by an N+k pool of instances in an active/backup configuration, wherein N is a number of active devices and k is a number of standby devices.

7. The method of claim 1, wherein for controlled shutdowns, data forwarding functions are drained before being removed from the pool.

8. The method of claim 1, wherein the data forwarding functions monitor each other using periodic polling, and failed data forwarding functions are removed from the pool.

9. The method of claim 1, wherein the pool of data forwarding functions comprise:

a packet handling component configured to managing traffic between the load balancer and the network function while handling failover events; and a pool supervisor component configured to:

monitor the data forwarding functions and remove data forwarding functions from the pool in response to a failure, or draining data forwarding functions when maintenance will be carried out for a given data forwarding function.

10. The method of claim 1, wherein each data forwarding function maintains a measure of its health and an amount of time associated with the measure.

11. The method of claim 10, wherein a lead data forwarding function is selected as a data forwarding function with a highest health value; and where multiple data forwarding functions have an equal value, a data forwarding function that has had the equal value for a longest time period is selected as the lead data forwarding function.

12. The method of claim 1, further comprising established a separate probing tunnel on the network function, the separate probing tunnel usable to determine which network function instance is primary.

13. The method of claim 1, wherein the tunnel connection is established using one of IPsec, L2TP, PPTP, GRE, or VXLAN.

14. A system for providing high availability network services in a communications network, the system comprising a plurality of network nodes including a network function implemented as two instances configured as an active instance and a backup instance, wherein the backup instance maintains state data such that the backup instance can actively provide services in response to a failure of the active instance, the system comprising:

a processing system; and a memory storing computer-executable instructions thereupon which, when executed by the processing system, cause the system to perform operations comprising:

receiving, by a pool of data forwarding functions implemented on the plurality of network nodes, ingress data packets addressed to the network function via a public network address;

forwarding, by the pool of data forwarding functions over a tunnel connection, the ingress data packets to the network function based on an overlay network MAC address of the active instance;

determining that the active instance has failed and that the backup instance will provide the network function, wherein determining that the active instance has failed comprises detecting a loss of a direct link between a forwarding node and an edge node hosting the active instance;

removing an association between the overlay network MAC address and the edge node from a forwarding table without exchanging state information with the backup instance; and forwarding, by the pool of data forwarding functions over the tunnel connection, subsequent ingress data packets to the network function based on an overlay network MAC address of the backup instance without waiting for underlay routing updates.

15. The system of claim 14, wherein the overlay network MAC address of the active instance and the backup instance are determined using gratuitous Address Resolution Protocol (ARP).

16. The system of claim 14, wherein the plurality of network nodes are virtual machines or containers.

17. A non-transitory computer-readable storage medium storing computer-executable instructions thereupon which, when executed by a processing system, cause the processing system to perform operations comprising:

receiving, from a load balancer by a pool of data forwarding functions implemented on a plurality of nodes of a communication network, ingress data packets addressed to a network function via a public network address, wherein the communications network comprises a plurality of network devices including the network function implemented as two instances configured as an active instance and a backup instance, wherein the backup instance maintains state data such that the backup instance can actively provide services in response to a failure of the active instance;

forwarding, by the pool of data forwarding functions over a tunnel connection, the ingress data packets to the network function based on an overlay network MAC address of the active instance;

determining that the active instance has failed and that the backup instance will provide the network function, wherein determining that the active instance has failed comprises detecting a loss of a direct link between a forwarding node and an edge node hosting the active instance;

removing an association between the overlay network MAC address and the edge node from a forwarding table without exchanging state information with the backup instance;

forwarding, by the pool of data forwarding functions over the tunnel connection, subsequent ingress data packets to the network function based on a overlay network MAC address of the backup instance without waiting for underlay routing updates; and sending egress data packets directly to the load balancer.

18. The non-transitory computer-readable storage medium of claim 17, wherein the overlay network MAC address of the active instance and the backup instance are determined using gratuitous Address Resolution Protocol (ARP).

19. The non-transitory computer-readable storage medium of claim 17, wherein the data forwarding functions monitor each other using periodic polling, and failed data forwarding functions are removed from the pool.

20. The non-transitory computer-readable storage medium of claim 17, wherein the pool of data forwarding functions comprise:

a packet handling component configured to managing traffic between the load balancer and the network function while handling failover events; and a pool supervisor component configured to:

monitor the data forwarding functions and remove data forwarding functions from the pool in response to a failure, or draining data forwarding functions when maintenance will be carried out for a given data forwarding function.

* * * * *